United States Patent [19]

Lum

[11] Patent Number: 4,613,548

[45] Date of Patent: Sep. 23, 1986

[54] POLYPHOSPHAZENE MAGNETIC TAPE LUBE

[75] Inventor: Genevieve S. Lum, Baton Rouge, La.

[73] Assignee: Ethyl Corporation, Richmond, Va.

[21] Appl. No.: 700,820

[22] Filed: Feb. 11, 1985

[51] Int. Cl.$^4$ .............................................. G11B 5/70
[52] U.S. Cl. ............................. 428/411.1; 252/62.54;
360/134; 360/135; 360/136; 427/128; 428/328;
428/329; 428/694; 428/695; 428/704; 428/900
[58] Field of Search ............... 428/694, 695, 421, 422,
428/900, 328, 329, 704, 411.1; 252/62.54;
427/128, 131; 260/927 N; 360/134–136

[56] References Cited

U.S. PATENT DOCUMENTS

| | | | |
|---|---|---|---|
| 4,018,967 | 4/1977 | Roller | 428/694 |
| 4,046,932 | 9/1977 | Hartmann et al. | 428/694 |
| 4,267,238 | 5/1981 | Chernega | 428/694 |
| 4,309,482 | 1/1982 | Suzuki et al. | 428/694 |
| 4,327,139 | 4/1982 | Schaefer et al. | 428/694 |
| 4,390,601 | 6/1983 | Ono et al. | 428/694 |
| 4,469,750 | 9/1984 | Fujiki et al. | 428/694 |
| 4,477,520 | 10/1984 | Hamada et al. | 428/694 |

OTHER PUBLICATIONS

Ratz et al., "J. Am. Chem. Soc.", 84, p. 551–555, 1962.
Lederle et al., "J. Am. Chem. and Eng. Data", 11, No. 2, pp. 221–228, 1966.

*Primary Examiner*—Ellis P. Robinson
*Attorney, Agent, or Firm*—Donald L. Johnson; John F. Sieberth; Joseph D. Odenweller

[57] ABSTRACT

A magnetic recording media containing a normally liquid polyphosphazene lubricant, e.g. low molecular weight linear or cyclic poly-fluoroalkoxy phosphazene mixtures.

8 Claims, No Drawings

POLYPHOSPHAZENE MAGNETIC TAPE LUBE

BACKGROUND OF THE INVENTION

Magnetic recording media are available in the form of tapes, disks, drums and cards and are used to preserve magnetic signals The signal on the recording media can be read by a magnetic recording head as the recording media moves past the recording head. The recording head is in very close proximity to the recording media and frequently contacts the recording media. Such contact causes wear of the thin layer of magnetic material on the recording media and shortens the useful life of the recording media.

Lubricants have been coated on or impregnated in the magnetic layer on magnetic recording media to lessen the wear caused by contact with the recording head. Hamada, et al. U.S. Pat. No. 4,477,520 describes magnetic recording media in which the magnetic coating contains a polyvinyl alkyl ether and is impregnated with a lubricant such as a fluoroalkyl polyether. Chernega, U.S. Pat. No. 4,267,238 describes flexible magnetic tape lubricated with fluorinated polyether telomers. Suzuki, et al. U.S. Pat. No. 4,309,482 describes magnetic coated recording media coated with a thin film of epoxy resin containing a lubricant such as polyol fatty acid esters, siloxanes, graphite, molydenum sulfide, fluorinated graphite or teflon. Schaefer, et al., U.S. Pat. No. 4,327,139 describes recording disks coated with a thin film of perfluoropolyether oil. Ono, et al., U.S. Pat. No. 4,390,601 relates to a vapor deposited magnetic coated recording media which have a surface coating lubricant, e.g. paraffin, fatty acids, oxyfatty acids, fatty acid amides, fatty acid esters and metal soaps.

SUMMARY OF THE INVENTION

The useful life of magnetic recording media can be extended by including a small lubricating amount of a normally liquid polyphosphazene, especially polyfluoroalkoxy phosphazene, in the thin lamina of magnetic material on the recording media.

DESCRIPTION OF THE PREFERRED EMBODIMENTS

A preferred embodiment of the invention is a magnetic recording media comprising a substrate having a magnetic recording lamina, said lamina comprising magnetic particles and a binder, said lamina being coated or impregnated with a lubricating amount of a low molecular weight, normally liquid phosphazene oligomer, said oligomer being a linear or cyclic phosphazene oligomer or mixtures thereof containing about 3-20 $+P<=N+$ units wherein the phosphorus substituents are the same or different and are selected from alkoxy, haloalkoxy, aryloxy, alkylaryloxy, alkoxyaryloxy, haloaryloxy, haloalkoxyaryloxy, haloalkylaryloxy, nitroaryloxy, aminoaryloxy, aminoalkylaryloxy, diaminoalkylaryloxy, haloalkoxy and polyhaloalkoxy.

Magnetic recording media include a substrate which may be a non-magnetic metal such as aluminum or a plastic such as a polyester. A coating of magnetic particles such as gamma-$Fe_2O_3$, cobalt/gamma-$Fe_2O_3$, $CrO_2$, Fe, Fe-Co and the like is applied to the substrate together with a binder. The binder is usually a thermosetting resin such as an acrylic resin, an epoxide or a phenolic resin or a thermoplastic resin such as a polyvinylbutyral, a polyvinylacetate or a polyvinylalkylether. One such epoxy-type binder is described in Hartmann, et al., U.S. Pat. No. 4,046,932. The amount of magnetic particles in the lamina can vary widely, e.g. 40-90 weight percent. The preferred magnetic particles are ferromagnetic particles.

The polyphosphazene lubricant may be applied to the surface of the recording lamina and allowed to impregnate the recording lamina. Alternatively, the polyphosphazene lubricant may be included in the composition of the mixture applied to the substrate to form the recording lamina. This composition includes the binder, magnetic particles and a volatile solvent and the polyphosphazene lubricant Suitable solvents include aromatic hydrocarbons (e.g. toluene, xylene, etc.), halogenated hydrocarbons (e.g. methylene chloride, chloroform, carbon tetrachloride, 1,1,2-trichloroethane, 1,1,1-trichloroethane, etc.), ethers (e.g. diethylether, dimethoxyethane, dioxane, tetrahydrofuran, diethoxyethane, etc.), ether alcohols (e.g. 2-ethoxy ethanol, monomethylether of diethylene glycol, etc.), ketones (e.g. acetone, methylether ketone, etc.), esters (e.g. ethyl acetate, ethylbutyrate, amyl acetate, ethylpropionate, 2-ethoxyethyl acetate, etc.), alicyclic hydrocarbons (e.g. cyclohexane, cycloheptane, cyclooctane, etc.), dimethyl formamide, dimethylsulfoxide and mixtures of such solvents. A typical magnetic lamina forming composition referred to as "paint" will contain in parts by weight

| | |
|---|---|
| magnetic particles | 40-90 |
| polymer binder | 9-59 |
| polyphosphazene lubricant | 0.1-5 |
| solvent | 100-1,000 |
| curing agent or catalyst | optional |

The amount of solvent will of course depend on the polymer binder and the type of solvent used. The actual amount should be a solvent amount as required to dissolve the polymer binder and polyphosphazene lubricant. Alternatively, the polyphosphazene lubricant can be omitted from the paint and applied by a surface impregnation method.

The magnetic particles remain suspended in the paint. After application of the lamina forming paint, the magnetic particles are oriented by application of a magnetic field. Then the solvent is evaporated and if necessary, the recording media is heated or irradiated to cure the polymer binder. Magnetic recording disks can be polished following polymer cure using for example a diamond dust (5-8 micron) paste to form a flat thin (2-5 micron) recording lamina.

The polyphosphazene lubricant can be a linear or cyclic low molecular weight normally liquid polyphosphazene. Such polyphosphazenes contain about 3-50 $+P<=N+$ units in which the phosphorus atom substituents are the same or different and are selected from alkoxy, alkoxyaryloxy, haloalkoxy, haloalkoxyaryloxy, aryloxy, alkylaryloxy, haloaryloxy, haloalkylaryloxy, nitroaryloxy, aminoaryloxy, aminoalkylaryloxy, diaminoalkylaryloxy, haloalkyl, dihaloalkyl, trihaloalkyl, and the like.

The polyphosphazenes are made by first making a linear or cyclic phosphonitrilic chloride oligomer and then substituting the oligomer by reaction with the appropriate alkali metal compound (e.g. alkoxide, aryloxide, haloalkoxide, haloaryloxide and the like). Cyclic phosphonitrilic chlorides are made by known methods such as by the addition of PCl$_5$ to a monochlorobenzene slurry of a stoichiometric excess of finely divided ammonium chloride at about 120°–130° C. A mole ratio of 1:1.1–1.5 usually will give a good conversion to cyclics. The cyclics can be recovered by filtering to remove unreacted NH$_4$Cl, evaporation of at least part of the solvent and crystallization of the crude cyclics. The cyclics are generally about 70–85 weight percent trimer, 5–15 weight percent tetramer and small amounts of higher cyclics. These different cyclics can be separated by distillation but it is preferred to use the cyclics as a crude mixture of trimer, tetramer and higher cyclics. This is because pure cyclics such as pure trimer tend to be crystalline when the covalent chlorine atoms are replaced with certain substituent groups. This can be avoided by using a crude cyclic mixture and/or using a mixture of at least two different substituent groups to replace chlorine.

Low molecular weight linear phosphonitrilic chloride oligomers are prepared in a similar manner but using a stoichiometric excess of PCl$_5$ and the inverse addition of the NH$_4$Cl to a solution of the PCl$_5$. The linear oligomers prepared in this manner will contain some cyclic which can be removed. A typical composition is 15–30 weight percent cyclics and the balance mainly linears containing about 3–50

units, generally averaging about 4–10 of such units.

The linears prepared in this manner have an end-capped group of the structure —PCl$_3$+PCl$_6$−. In a highly preferred embodiment, the linear phosphonitrilic chloride oligomer is contacted with sulfur dioxide to remove the —PCl$_3$+PCl$_6$− end group and to form —POCl$_2$ end groups.

The linear or cyclic phosphonitrilic chloride is fairly sensitive to hydrolysis so is preferably further reacted to replace the chlorine atoms with other groups. This is readily accomplished by reacting a solution (for example in monochlorobenzene) of the phosphonitrilic chloride with an ether solution of an alkali metal alkoxide or aryloxide including substituted alkoxides or aryloxides or mixtures thereof. Examples of alkoxide substituents are halogen (e.g. chlorine, fluorine, bromine, etc.), nitro, aryl (e.g. phenyl), alkoxy, haloalkoxy, acyl, acyloxy, amino, alkylamino and the like. Examples of aryloxide substituents are halogen (e.g. chlorine, fluorine, bromine, etc.), alkyl (e.g. methyl, ethyl, isopropyl, etc.), alkoxy (e.g. methoxy, ethoxy, butoxy, etc.), haloalkoxy, haloalkyl, nitro, amino, alkylamino, dialkylamino, nitrile, acyl, acyloxy and the like.

The more preferred phosphorus substituents are the fluorine substituted alkoxy groups. Examples of these are 2,2,2-trifluoroethoxy, 3,3,3,2,2-pentafluoropropoxy, 2,2-difluoroethoxy, 4,4,4,3,3,2,2-heptafluorobutoxy and the like including and preferably mixtures thereof.

Of the fluoroalkoxy groups the more preferred are those having the formula —OCH$_2$(CF$_2$)$_n$CF$_2$X wherein n is 0 or an integer from 1 to 13, more preferably an odd integer and X is selected from hydrogen and fluorine and most preferably mixtures of such fluoroalkoxy groups.

The following examples show the preparation of certain preferred fluorinated phosphazene oligomer lubricants.

EXAMPLE 1

In a reaction vessel was placed 217.5 grams of a 15.9 weight percent solution of a crude cyclic phosphonitrilic chloride mixture, mainly trimers and tetramers in cyclohexane/tetrahydrofuran. To this was added 797 grams (0.66 moles) of a solution of NaOCH$_2$—(CF$_2$)$_{1-9}$—CF$_2$H in dried tetrahydrofuran (THF). This mixture was stirred 12 hours at 70° C. At this stage, the pH was 8. An additional 0.03 moles of the sodium fluoroalkoxy solution was added and reacted 1 hour at 70° C. The mixture was cooled and acidified with concentrated H$_2$SO$_4$ to pH 4–5. The organic phase was washed 3 times with deionized water, dried over anhydrous magnesium sulfate and stripped of solvent. The oil was then passed through an activated alumina column using a chlorobenzene/THF solution as an elluent. The solvents were stripped from the resultant brown oil and residual solvent and fluoroalcohols were evaporated using a wiped film evaporator. The oil had a pour point of −37° C. and viscosities of 158 cs at 40° C. and 13.3 cs at 100° C.

EXAMPLE 2

This reaction was conducted in the same manner as Example 1 but using 290 grams (0.398 moles of PNCl$_2$) of crude cyclophosphaene solution and 318.68 grams (0.264 moles) of the sodium fluoroalkoxide solution described in Example 1. The mixture was stirred at 70° C. for 1 hour and then 451.51 grams (0.54 moles) of a solution of sodium trifluoroethoxide in THF was added and stirred at 70° C. for 3 hours. Finally, 98 grams (0.08 moles) of an equal mole solution of sodium trifluoroethoxide and NaOCH$_2$(CF$_2$)$_{1-9}$CF$_2$H in dried THF was added. This was stirred for 8 hours at 70° C. and after cooling, the reaction mixture was acidified with sulfuric acid. The organic phase was water washed, stripped of solvent on a rotary evaporator and then passed 3 times through a wiped film evaporator to remove residual volatiles. The resultant oil had a pour point of −43° C. and viscosity of 49 cs at 40° C. and 6.11 cs at 100° C.

EXAMPLE 3

A phosphonitrilic chloride oligomer was made by placing 300 grams of chlorobenzene and 600 grams (8 mole) of finely divided PCl$_5$ in a reaction vessel. While stirring, 120 grams (2.2 moles) of finely divided NH$_4$Cl was added and the mixture stirred at 120° C. until the PCl$_5$ dissolved. The mixture was then stirred 24 hours at 125°–130° C. It was then refluxed for 48 hours. Analysis by $^{31}$P-NMR indicated 20.6 mole percent trimer, 5.1 mole percent tetramer, 2.0 mole percent unknown and 72.3 mole percent linear oligomer containing an average of 5.7-PNCl$_2$-units.

In another reaction vessel was placed 236.5 grams of the above oligomer solution under nitrogen. Then 20 grams of SO$_2$ was bubbled through the reaction mixture over a 3 hour period. After stirring overnight, the mixture was diluted with 250 mL of dried chlorobenzene. The chlorobenzene was distilled out to aid in removal of POCl$_3$ and SOCl$_2$. Analysis by $^{31}$P-NMR indicates that all PCl$_3$+PCl$_6$− end groups were converted to —POCl$_2$ end groups.

In another reaction vessel was placed 114.26 grams (0.4 moles) of a 40.67 weight percent solution of the above —POCl$_2$ end-capped oligomer in chlorobenzene. Then 316.8 grams of a solution of NaOCH$_2$(CF$_2$)$_{1-9}$CF$_2$H (0.267 moles) in THF was added. The mixture was stirred 1 hour at 70° C. and then 323.2 grams (0.533 moles) of a sodium trifluoroethoxide solution in THF was added and stirred 2 hours at 70° C. Finally, 75.7 grams (0.08 moles) of an equal - mole solution of sodium trifluoroethoxide and sodium fluoroalkoxides in THF was added and stirred at 70° C. until the total reaction time was 12 hours. The pH at this time was 6–7. An additional 10 mole percent excess (71.7 grams) of the solution of sodium trifluoroethoxide and sodium fluoroalkoxides was added and stirred 2 hours at 70° C. The mixture was cooled and acidified with concentrated sulfuric acid to pH 5. The organic phase was water washed, stripped of solvent on a rotary evaporator and passed through an activated alumina column using a THF elluent. The brown organic material was again stripped of solvent and passed through a wiped-film evaporator 3 times to remove residual volatiles. To remove residual sodium content, the oil was diluted with 200 mL THF, washed with 5 weight percent aqueous sulfuric acid and passed through a wiped-film evaporator. The resultant oil had a pour point of −21° C. and a viscosity of 824 cs at 40° C. and 65 cs at 100° C.

The lubricant can be applied to the surface of a magnetic recording media made by conventional methods. For example, a magnetic paint can be made by mixing

|  | Parts by Weight |
|---|---|
| gamma Fe$_2$O$_3$ particles | 55 |
| acrylic resin | 22.5 |
| epoxy resin | 13.5 |
| phenolic resin | 9.0 |
| toluene | 150 |
| xylene | 150 |
| 2-ethoxyethyl acetate | 50 |

After blending in a ball mill, the paint can be applied to an aluminum disk by a spin technique to form a very thin film. This film can be dried and cured at 200°–230° C. The coated disk can then be polished using a diamond dust paste. Any of the present polyphosphazene lubricants can then be applied to the surface of the magnetic coating and allowed to impregnate the surface. Any excess lubricant can then be removed.

Alternatively, a small amount (e.g. 0.05–3 parts by weight) of any of the polyphosphazene lubricants can be included in the magnetic paint composition and applied to the recording substrate by conventional methods.

I claim:

1. A magnetic recording media comprising a substrate having a magnetic recording lamina, said lamina comprising magnetic particles and a binder, said lamina being coated or impregnated with a lubricating amount of a low molecular weight, normally liquid phosphazene oligomer, said oligomer being a mixture of linear and/or cyclic phosphazene oligomers containing about 3–20 $(\text{-P}<=\text{N-})$ units wherein the phosphorus substituents are the same or different and are a mixture of fluoroalkoxy groups having the structure —OCH$_2$—(CF$_2$)$_n$CF$_2$X wherein n is an integer from 0 to 13 and X is H or F.

2. A magnetic recording media of claim 1 wherein substantially all of said phosphorus substituents are said fluoroalkoxy groups.

3. A magnetic recording media of claim 1 wherein said phosphazene oligomer comprises a major amount of a cyclic phosphazene oligomer containing 3 to about 7 $(\text{-P}<=\text{N-})$ units.

4. A magnetic recording media of claim 3 wherein said phosphazene oligomer consists mainly of cyclic phosphazene trimers, tetramers or mixtures thereof.

5. A magnetic recording media of claim 4 wherein substantially all of said phosphorus substituents are said fluoroalkoxy groups.

6. A magnetic recording media of claim 5 wherein n is an odd integer.

7. A magnetic recording media of claim 1 wherein said phosphazene oligomer comprises a major amount of a linear phosphazene oligomer containing 3 to about 20 $(\text{-P}<=\text{N-})$ units.

8. A magnetic recording media of claim 7 wherein substantially all of said phosphorus substituents are said fluoroalkoxy groups.

* * * * *